US012663829B1

(12) United States Patent
Namboodiri et al.

(10) Patent No.: US 12,663,829 B1
(45) Date of Patent: Jun. 23, 2026

(54) CLOSED-LOOP SAMPLING METHODS AND SYSTEMS

(71) Applicant: Alphacore, Inc., Tempe, AZ (US)

(72) Inventors: Sachin Namboodiri, Tempe, AZ (US);
Phaneendra Bikkina, Tempe, AZ (US)

(73) Assignee: Alphacore, Inc., Tempe, AZ (US)

( * ) Notice: Subject to any disclaimer, the term of this patent is extended or adjusted under 35 U.S.C. 154(b) by 0 days.

(21) Appl. No.: 19/272,705

(22) Filed: Jul. 17, 2025

(51) Int. Cl.
 G06F 1/10 (2006.01)
 G04F 10/00 (2006.01)
 G06F 1/12 (2006.01)
(52) U.S. Cl.
 CPC .............. G06F 1/12 (2013.01); G04F 10/005 (2013.01)
(58) Field of Classification Search
 CPC ..................................... G06F 1/12; G06F 1/10
 See application file for complete search history.

(56) References Cited

U.S. PATENT DOCUMENTS

| | | | |
|---|---|---|---|
| 9,319,217 B1 * | 4/2016 | Wohlrab | ............. H03M 1/1255 |
| 10,784,878 B1 * | 9/2020 | Sukumaran | ......... H03M 1/0604 |
| 10,958,257 B1 * | 3/2021 | Sheen | ...................... H03K 5/06 |
| 2010/0026350 A1 * | 2/2010 | Ozawa | ................... H04L 7/033 |
| | | | 327/141 |
| 2012/0148002 A1 * | 6/2012 | Kim | ................... H03M 1/1265 |
| | | | 375/371 |
| 2013/0214959 A1 * | 8/2013 | Lee | ......................... H03M 1/50 |
| | | | 341/166 |
| 2019/0302015 A1 * | 10/2019 | Pate | ...................... G01N 22/00 |
| 2020/0083896 A1 * | 3/2020 | Mostafanezhad | ... H03M 1/1265 |

* cited by examiner

*Primary Examiner* — Phil K Nguyen
(74) *Attorney, Agent, or Firm* — LOZA & LOZA, LLP

(57) ABSTRACT

Embodiments of a sampling system and a method for sampling are disclosed. In an embodiment, a sampling system includes a sampler array that includes sampling cells, a timing controller connected to the sampler array to form a closed loop and configured to correct a timing mismatch in the sampler array, and a time to digital converter (TDC) configured to perform indexing of the sampling cells in the sampler array.

18 Claims, 13 Drawing Sheets

Sampling Mode

Readout Mode

1202 ~ Correct a timing mismatch in a sampler array that includes sampling cells using a timing controller that is connected to the sampler array to form a closed loop 1204 ~ Perform indexing of the sampling cells in the sampling array using a time to digital converter (TDC)

CLOSED-LOOP SAMPLING METHODS AND SYSTEMS

BACKGROUND

With advancements in technology, there is an increasing demand for systems capable of capturing high-speed signals with minimal power consumption and cost. Conventional high-speed analog-to-digital converters (ADCs) are often constrained by power requirements, complexity, and physical area. Therefore, there is a need for sampling technology that can provide reliable and power efficient high-speed signal acquisition.

SUMMARY

Embodiments of a sampling system and a method for sampling are disclosed. In an embodiment, a sampling system includes a sampler array that includes sampling cells, a timing controller connected to the sampler array to form a closed loop and configured to correct a timing mismatch in the sampler array, and a time to digital converter (TDC) configured to perform indexing of the sampling cells in the sampler array. Other embodiments are also described.

In an embodiment, the TDC is further configured to locate a first sampling cell and a last sampling cell of the sampling cells in the sampler array in response to a trigger signal.

In an embodiment, the TDC is further configured to locate the first sampling cell in the sampler array that corresponds to an arrival of the trigger signal.

In an embodiment, the timing controller is further configured to synchronize the closed loop based on an external reference clock for sampling clock alignment.

In an embodiment, the sampling system further includes an analog-to-digital converter (ADC) configured to convert an analog output of the sampler array into a digital output signal.

In an embodiment, the sampling system further includes a digital signal processing (DSP) unit configured to process the digital output signal based on an input from the TDC.

In an embodiment, the TDC is further configured to perform indexing of the sampling cells in the sampler array to generate a TDC code, and the DSP unit is further configured to rearrange data in the digital output signal depending on the TDC code.

In an embodiment, the sampling cells are configured to capture and store analog values at discrete time intervals, and each of the sampling cells is configured to operate in one of a sampling mode and a readout mode.

In an embodiment, each of the sampling cells includes a sampling switch, a capacitor, a buffer, a readout switch, and a delay cell, the sampling switch and the capacitor are configured to capture and store analog data, and the readout switch and the buffer are configured to read the stored analog data.

In an embodiment, data that is read out from the sampler array is sequentially arranged in a digital domain.

In an embodiment, a sampling system includes a sampler array that includes sampling cells, a timing controller connected to the sampler array to form a closed loop and configured to synchronize the closed loop based on an external reference clock for sampling clock alignment, and a time to digital converter (TDC) configured to perform indexing of the sampling cells in the sampler array to generate a TDC code.

In an embodiment, the TDC is further configured to locate a first sampling cell and a last sampling cell of the sampling cells in the sampler array in response to a trigger signal, and the TDC is further configured to locate the first sampling cell in the sampler array that corresponds to an arrival of the trigger signal.

In an embodiment, the sampling system further includes an analog-to-digital converter (ADC) configured to convert an analog output of the sampler array into a digital output signal.

In an embodiment, the sampling system further includes a digital signal processing (DSP) unit configured to process the digital output signal based on the TDC code.

In an embodiment, the sampling cells are configured to capture and store analog values at discrete time intervals, and each of the sampling cells is configured to operate in one of a sampling mode and a readout mode.

In an embodiment, each of the sampling cells comprises a sampling switch, a capacitor, a buffer, a readout switch, and a delay cell, the sampling switch and the capacitor are configured to capture and store analog data, and the readout switch and the buffer are configured to read the stored analog data.

In an embodiment, data that is read out from the sampler array is sequentially arranged in a digital domain.

In an embodiment, a method for sampling involves correcting a timing mismatch in a sampler array that includes sampling cells using a timing controller that is connected to the sampler array to form a closed loop and performing indexing of the sampling cells in the sampler array using a time to digital converter (TDC).

In an embodiment, the method further includes converting an analog output of the sampler array into a digital output signal using an analog-to-digital converter (ADC).

In an embodiment, the method further includes rearranging data in the digital output signal based on an input from the TDC using a digital signal processing (DSP) unit.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
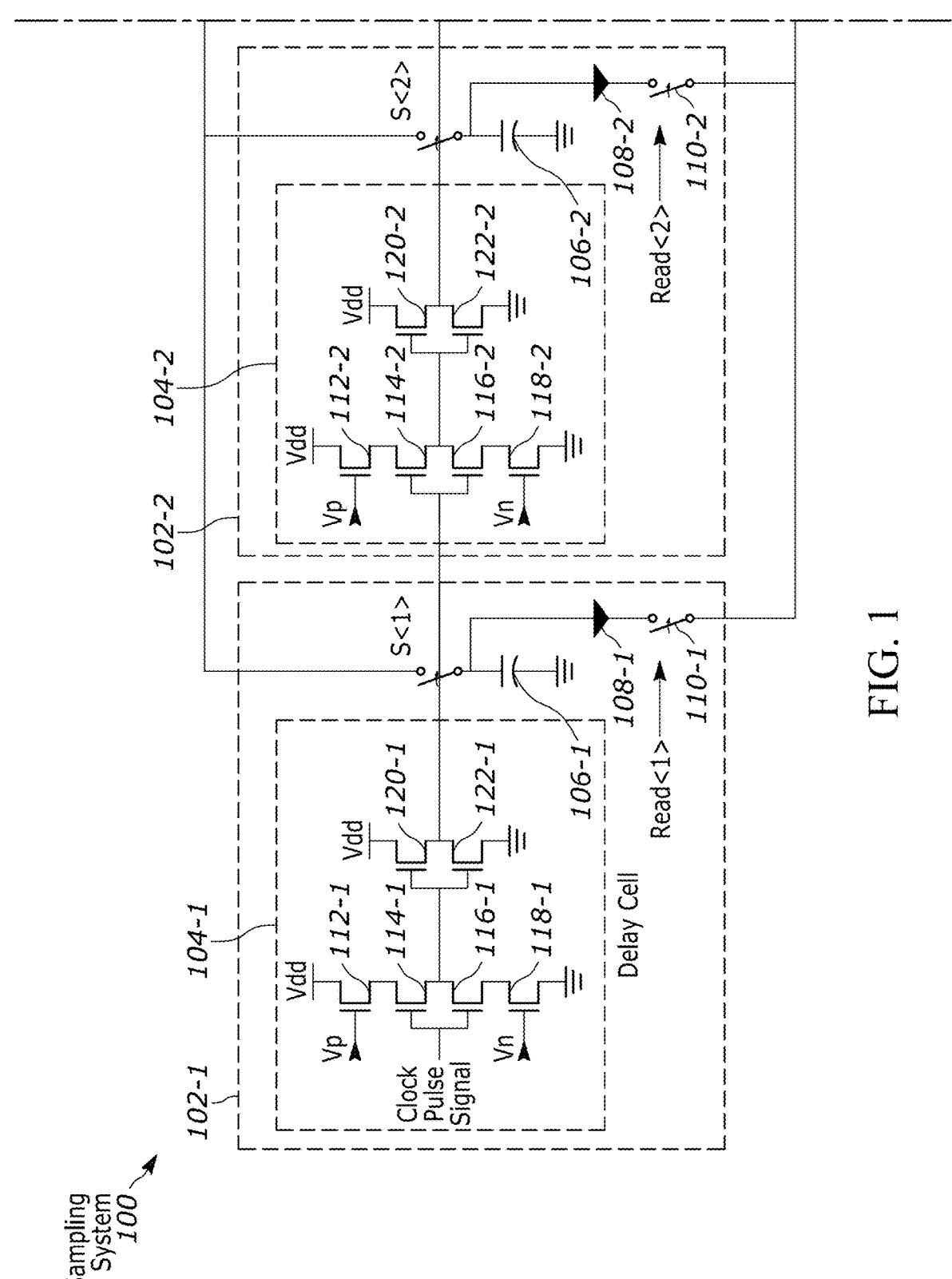
FIG. 1 depicts a sampling system with an array of high-speed samplers and memory buffers/delay cells.
Figure 1:
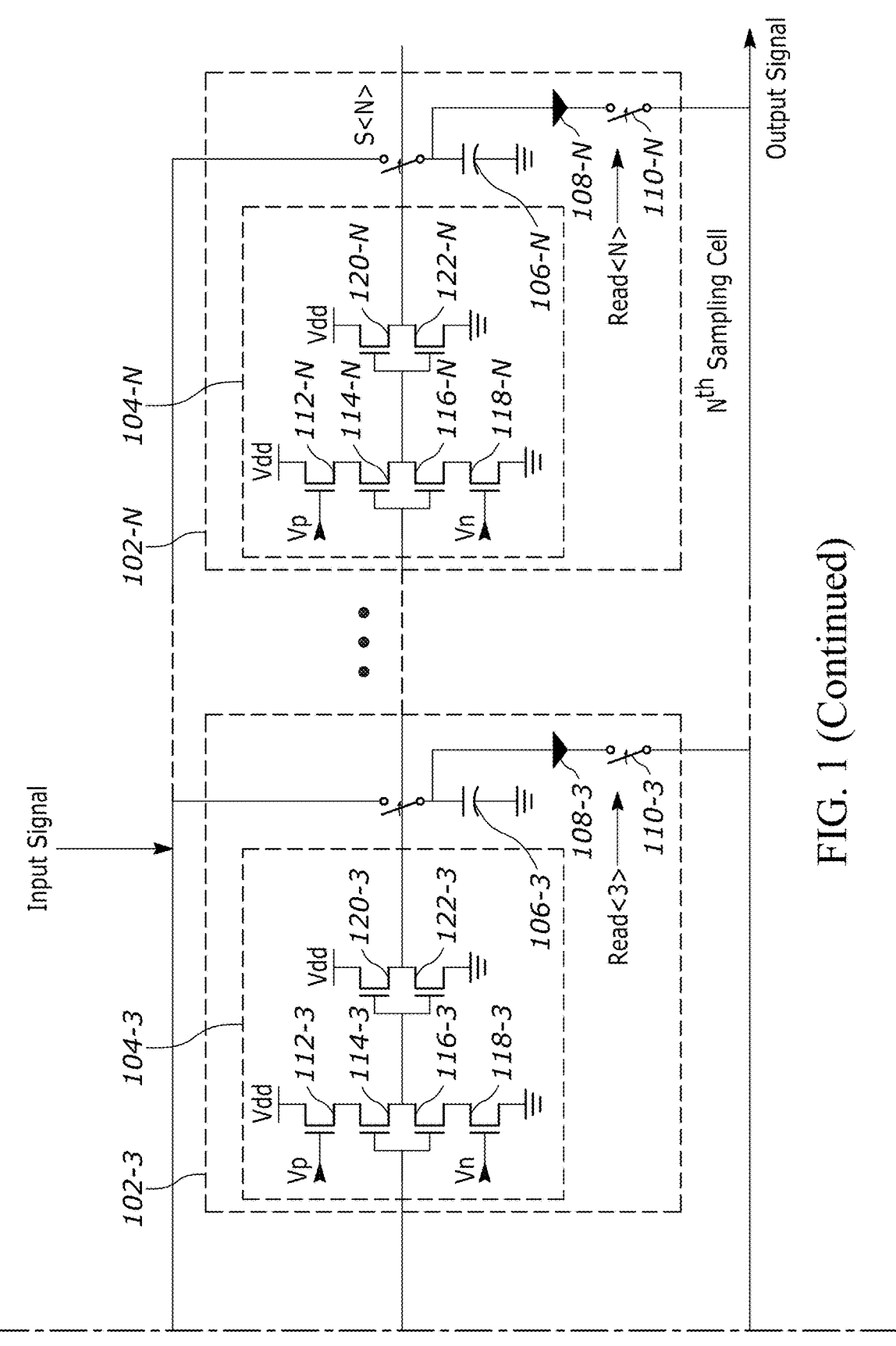

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Conventional high-speed signal acquisition technologies are often constrained by power requirements, complexity, and physical area. An alternative approach involves the use of fast transient digitizers, which employ an array of high-speed samplers and memory buffers to sample and store analog signals efficiently. The stored data can subsequently be read at a lower speed, reducing the need for high-speed data processing systems and reducing overall system complexity and power consumption.

FIG. 1 depicts a sampling system 100 with an array of high-speed samplers and memory buffers/delay cells. As depicted in FIG. 1, the sampling system 100 includes a sampler array with N (N being a positive integer) sampling cells 102-1, . . . , 102-N. Each of the sampling cells 102-1, . . . , 102-N includes a sampling switch S<1>, . . . , or S<N>, a capacitor 106-1, . . . , or 106-N, a buffer 108-1, . . . , or 108-N, a readout switch 110-1, . . . , or 110-N, and a delay cell 104-1, . . . , or 104-N. The sampling switches S<1>, . . . , S<N> are controlled by the array of delay cells 104-1, . . . , 104-N. Specifically, each of the sampling switches S<1>, . . . , S<N> is controlled by or through a corresponding delay cell 104-1, . . . , or 104-N. Each of the delay cells 104-1, . . . , 104-N includes inverter cells that are connected in a cascaded manner and formed by corresponding transistors 112-1, . . . , or 112-N, 114-1, . . . , or 114-N, 116-1, . . . , or 116-N, 118-1, . . . , or 118-N, 120-1, . . . , or 120-N, and 122-1, . . . , or 122-N, and a time delay $t_d$ introduced by these inverters determines the delay of the delay cells 104-1, . . . , 104-N.

Figure 2A:
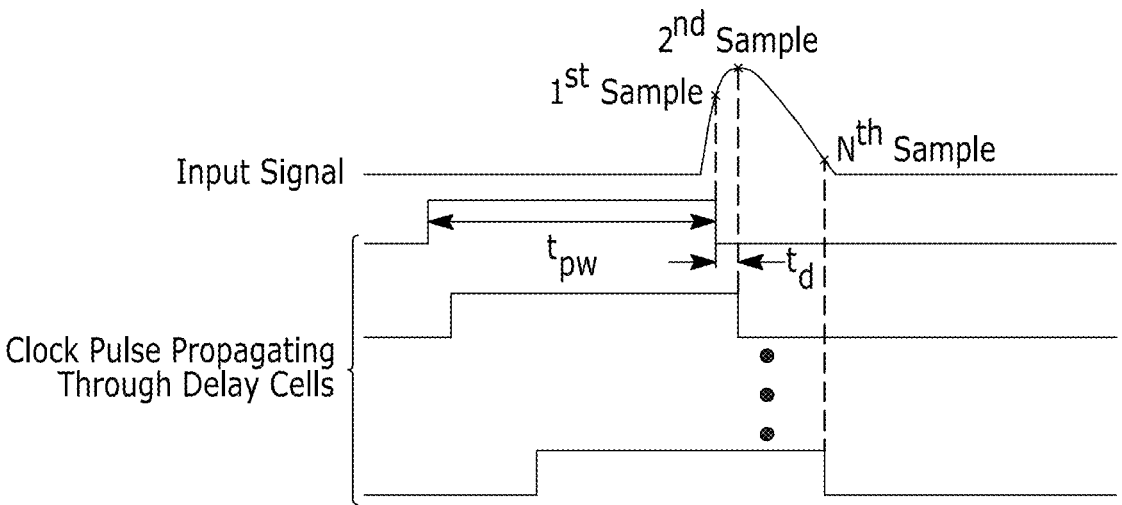
FIG. 2A depicts an example timing diagram of a sampling process of the sampling system of FIG. 1.
Figure 2B:
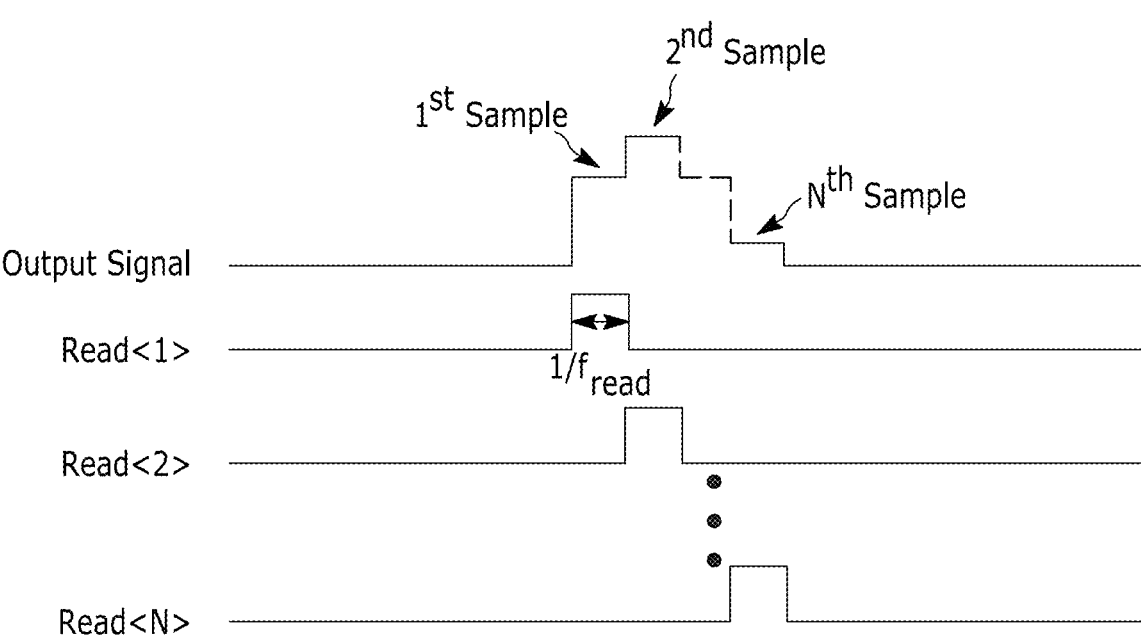
FIG. 2B depicts an example timing diagram of a readout process of the sampling system of FIG. 1.

The sampling system 100 can operate in two primary operation modes, which are a sampling mode and a readout mode. In the sampling mode, a clock pulse signal having a pulse width $t_{pw}$ is applied at the input of the first delay cell 104-1. The clock pulse signal sequentially propagates through the array of delay cells 104-1, . . . , 104-N, which means that the falling edge of the clock pulse signal sequentially turns off the sampling switches, S<1> to S<N>, and thus capturing the instantaneous analog values. The rate at which the signal is captured is determined by the time delay $t_d$ and the effective sampling rate can be defined as $1/t_d$ or $f_s$. This delay can also made programmable by incorporating a current starving mechanism in one of the inverters in the delay cell. Bottom plate sampling is also included to ensure distortion less sampling (not illustrated in FIG. 1). The sampling capacitor values can be optimized to minimize thermal noise (KT/C noise). The top plate of the capacitor 106-1, . . . , or 106-N is also connected to a corresponding buffer (e.g., a source follower) 108-1, . . . , or 108-N for the readout portion. The sampling mode is completed once the clock pulse signal is propagated through the entire delay cell array 104-1, . . . , 104-N. FIG. 2A depicts an example timing diagram of a sampling process of the sampling system 100 of FIG. 1. After the sampling mode is completed, the readout mode is initiated where the stored voltage values in the capacitors 106-1, . . . , 106-N are accessed through the readout switches 110-1, . . . , 110-N, which are activated in a one-hot manner where the readout switch in each sampling cell will be switched on at a time. A one hot decoder, which is clocked at $f_{read}$, can be used to generate the one hot pulses, Read<1> to Read<N>, for the readout switches 110-1, . . . , 110-N. It is noted that $f_{read} \ll f_s$ such that the readout portion has relaxed bandwidth requirements. The output of the readout switches 110-1, . . . , 110-N can be coupled to a final buffer to enhance drive capability. For example, the sampling system 100 can reproduce a slow or stretched version of the sampled signal while preserving the integrity of the original signal. Employing this topology in a high-speed system has many benefits. For example, after the completion of high-speed sampling, the signal readout and post processing circuits can be realized using low bandwidth requirements, which eliminates the need for high-speed ADCs and other high-speed signal processing blocks and thus reduces cost and overall power consumption. FIG. 2B depicts an example timing diagram of a readout process of the sampling system 100 of FIG. 1.

Figure 3:
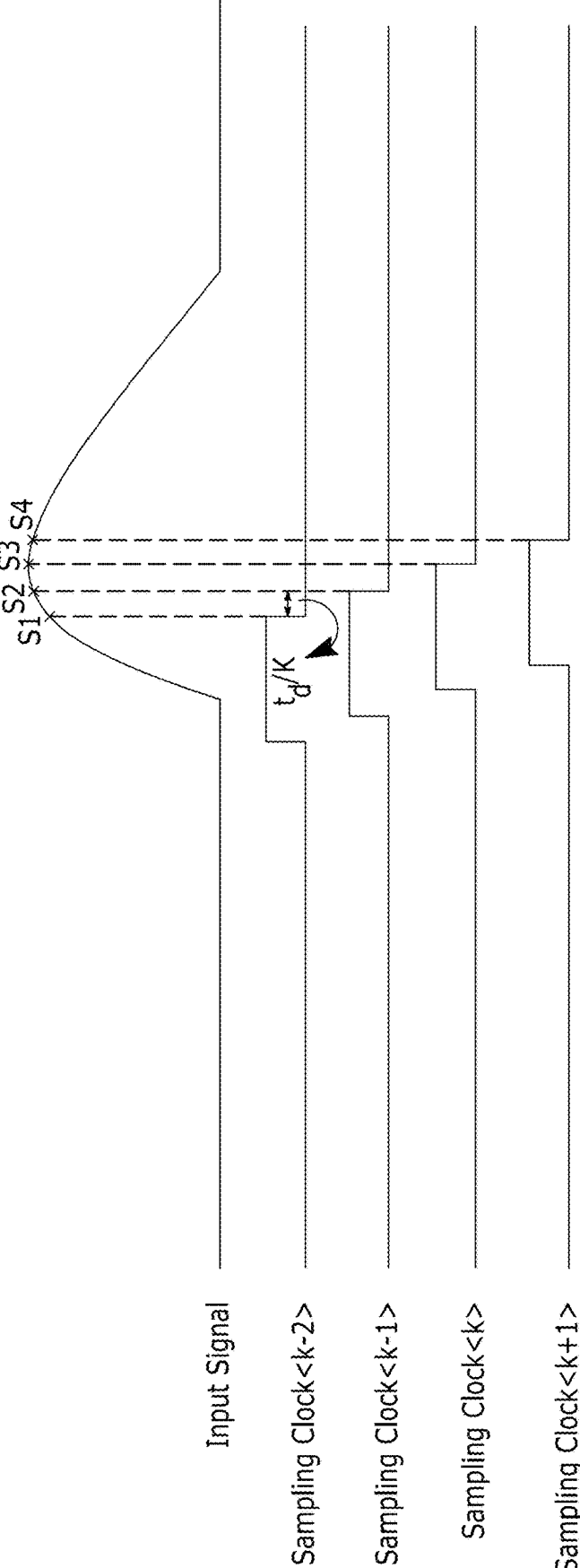
FIG. 3 illustrates an example signal timing diagram of a sampling process of the sampling system depicted in FIG. 1 where ideal clock pulses are considered.
Figure 4:
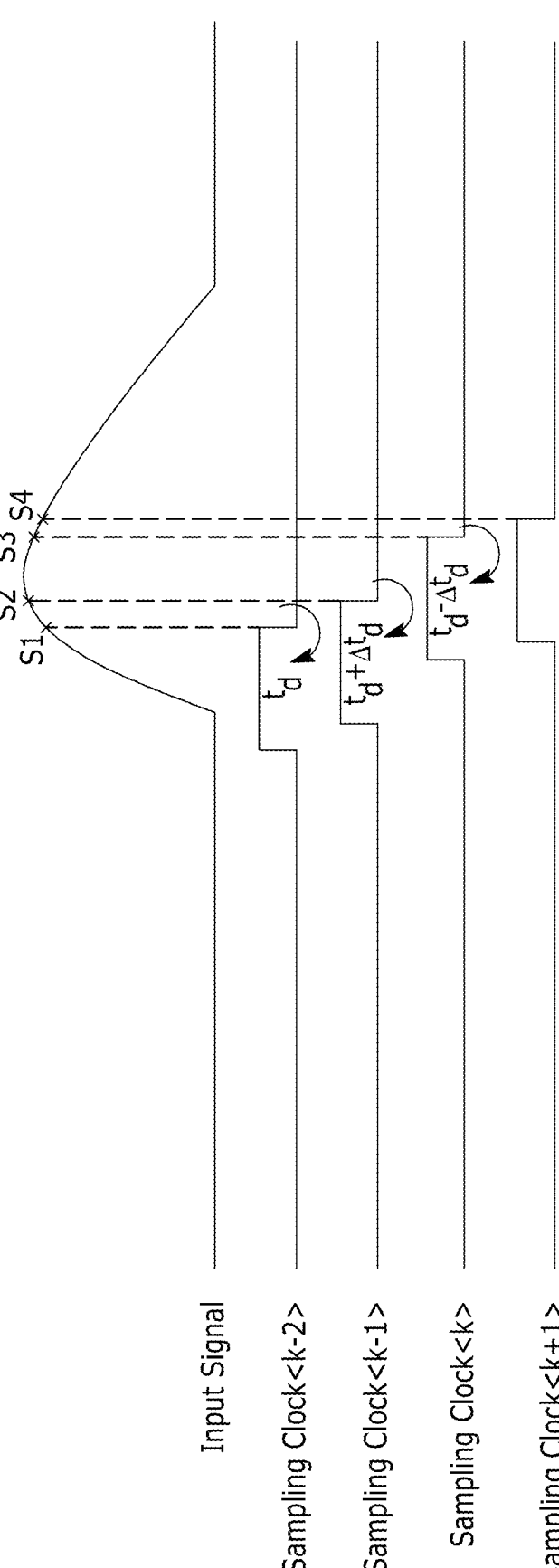
FIG. 4 illustrates an example signal timing diagram of a sampling process of the sampling system depicted in FIG. 1 where non-ideal/realistic clock pulses are considered.

A limitation of the sampling system 100 depicted in FIG. 1 is the variation of the timing in the delay cells 104-1, . . . , 104-N, which is mainly caused by the variation of propagation delays in the inverters in the delay cells 104-1, . . . , 104-N as they can be highly susceptible to process, voltage and temperature (PVT) conditions. Because of this, the sampling delay can vary across different bins and will result in $t_d \pm \Delta t_d$. This mismatch in the sampling clock can result in a non-uniform sampling and impact a precise capturing of the input signal. FIG. 3 illustrates an example signal timing diagram of a sampling process of the sampling system 100 depicted in FIG. 1 where ideal clock pulses are considered. In the example signal timing diagram illustrated in FIG. 3, four clock pulses that arrived at $k^{th}$ sampling cell of the sampler array are illustrated and the delay between each pulse is precisely $t_d$. The clock pulses, therefore, uniformly captures the samples, S1, S2, S3 and S4. An appropriate readout mechanism can be used to accurately reconstruct the captured signals. However, in a non-ideal scenario, the sampling clock delay can vary due to multiple factors. FIG. 4 illustrates an example signal timing diagram of a sampling process of the sampling system 100 depicted in FIG. 1 where non-ideal/realistic clock pulses are considered. In the example signal timing diagram illustrated in FIG. 4, four clock pulses that arrived at $k^{th}$ sampling cell of the sampler array are illustrated. The delay offset between Clock pulse<k−1> and Clock pulse<k> deviates from $t_d$ to $t_d + \Delta t_d$. Similarly, the delay offset between Clock pulse<k> and Clock pulse<k+1> has deviates to $t_d - \Delta t_d$, which results in a non-uniform sampling of the input signals and thus capturing incorrect samples for S1, S2, S3 and S4.

In accordance with an embodiment of the invention, to ensure precise timing between the sampling bins, a closed-loop configuration can be used to generate the sampling clocks. This technique can be used to minimize the timing mismatches and other undesired effects.

Figure 5:
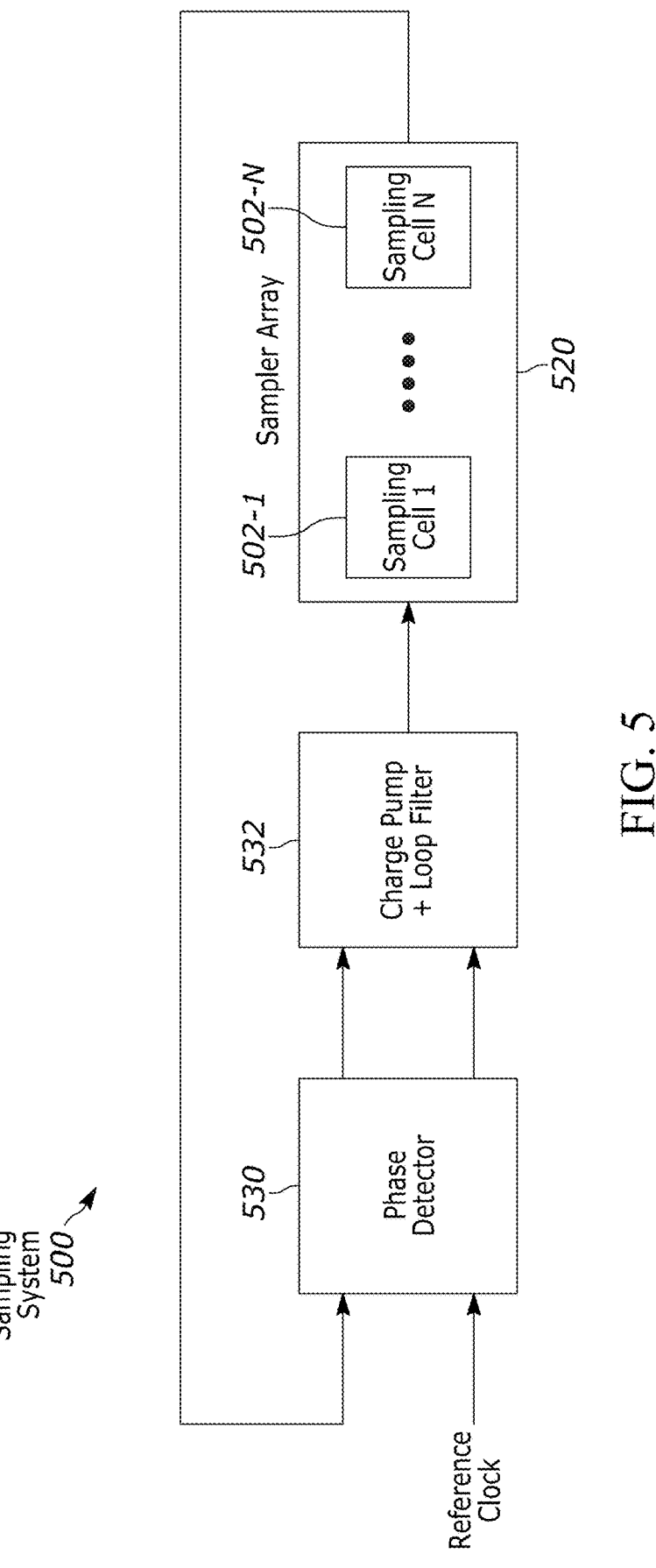
FIG. 5 depicts a sampling system with a closed-loop configuration in accordance to an embodiment of the invention.

FIG. 5 depicts a sampling system 500 with a closed-loop configuration in accordance to an embodiment of the invention. In the embodiment depicted in FIG. 5, the sampling system 500 includes a sampler array 520 with N (N being a positive integer) sampling cells 502-1, . . . , 502-N, a phase detector 530, and a charge pump 532 with a loop filter. In some embodiments, the phase detector 530 and the charge pump 532 form a timing controller connected to the sampler array 520 to form a closed loop and configured to correct a timing mismatch in the sampler array. The sampling cells 502-1, . . . , 502-N may be implemented in hardware (e.g., circuits), software, firmware, or a combination thereof. In some embodiments, at least one of the sampling cells 502-1, . . . , 502-N are implemented similarly to or the same as the sampling cells 102-1, . . . , 102-N of the sampling system 100 shown in FIG. 1. For example, at least one of the sampling cells 502-1, . . . , 502-N includes a sampling switch, a capacitor, a buffer, a readout switch, and a delay cell (e.g., the delay cell 104-1, . . . , or 104-N depicted in FIG. 1). The sampling switches can be controlled by the array of delay cells (e.g., the delay cells 104-1, . . . , 104-N depicted in FIG. 1). For example, each of the sampling switches is controlled by a corresponding delay cell. In some embodiments, each of the delay cells (e.g., the delay cells 104-1, . . . , 104-N depicted in FIG. 1) includes inverter cells that are connected in a cascaded manner and formed by corresponding transistors, and a time delay, ta, introduced by these inverters determines the delay of the delay cells (e.g., the delay cells 104-1, . . . , 104-N depicted in FIG. 1). In the embodiment depicted in FIG. 5, the delay cells within the sampler array 520 act as a delay line for the loop. In some embodiments, the phase detector 532 is configured to compare the sampling clock signal from the sampler array against an external clock with a frequency of $f_{ref}$. In some embodiments, the frequency of the sampling clock signal is $\frac{1}{2}Nt_d$, which is significantly lower than $f_{ref}$. The sampling system 500 operates similarly to a phase locked loop. For example, the phase detector 530 helps in identifying the phase mismatches from the sampler array and the charge pump 532 creates an analog tuning voltage to adjust the delay. Once the reference clock and the sampling clock are synchronized, a precise timing alignment can be ensured. The sampling system 500 depicted in FIG. 5 can be used to capture high-speed analog signals and reproduce the captured high-speed analog signals in a slow and stretched manner. The read out signal can be digitized using relatively low-speed ADCs. Replacing high speed ADCs with relatively low-speed ADCs can significantly reduce the power consumption and cost of a high-speed signal acquisition system. The sampling system 500 can be used in various applications, such as industrial applications, medical applications, computer applications, and/or consumer or enterprise applications. Although the illustrated sampling system 500 is shown with certain components and described with certain functionality herein, other embodiments of the sampling system 500 may include fewer or more components to implement the same, less, or more functionality. For example, the sampling system 500 may include a clock circuit configured to generate a sampling clock pulse. In some embodiments, the clock circuit includes an interpolator configured to generate a phase offset for the sampling clock pulse. In another example, although the sampling cells 502-1, . . . , 502-N are shown in FIG. 5 as being connected in certain topology, the network topology of the sampling system 500 is not limited to the topology shown in FIG. 5.

Figure 6:
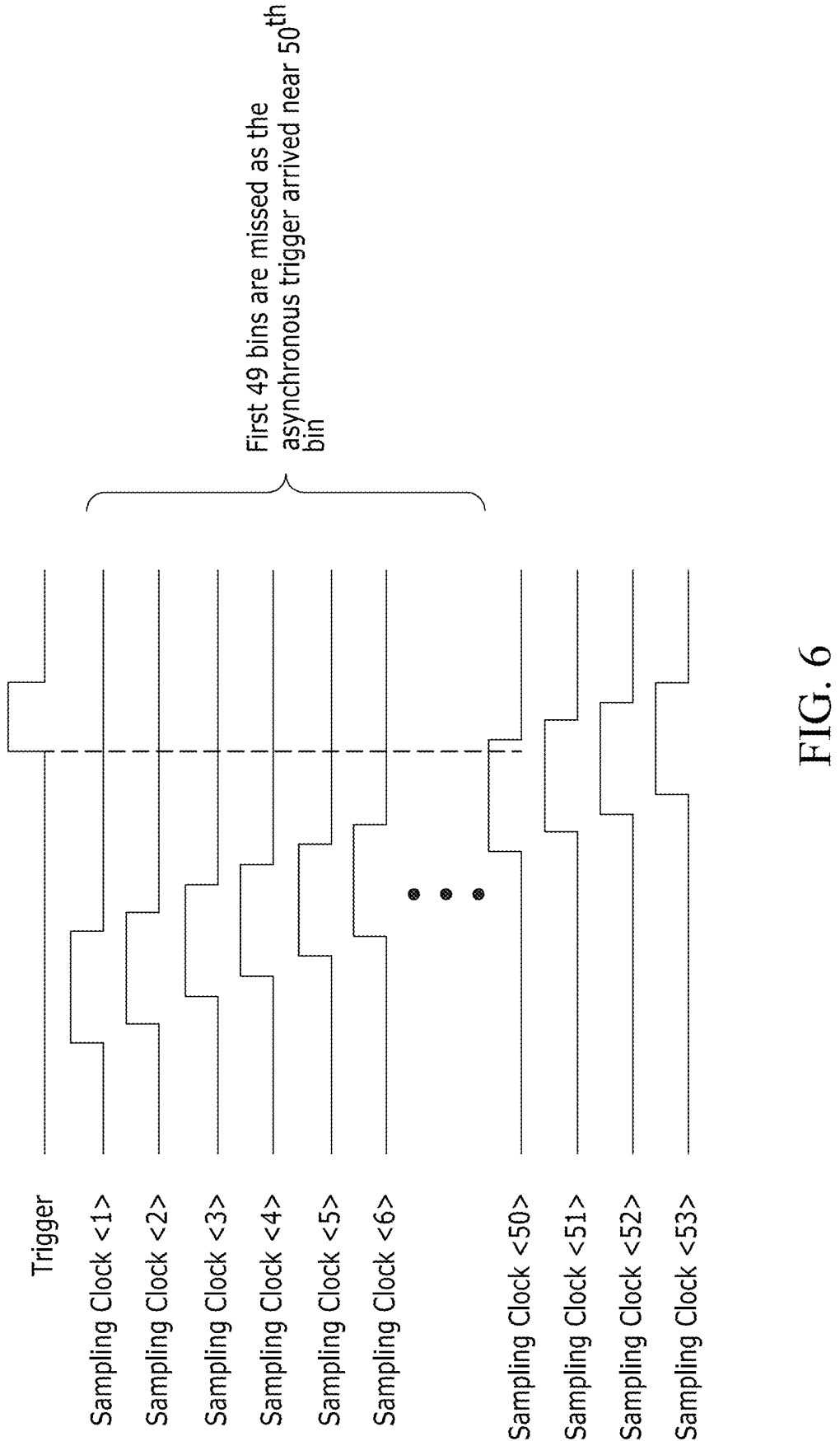
FIG. 6 illustrates an example signal timing diagram of a sampling process of the sampling system depicted in FIG. 5.

One challenge with this approach is that the sampling clock is continuously revolving though the sampler array similar to a ring oscillator. Therefore, a separate trigger pulse signal can be required to initiate the actual sampling process. Since the trigger signal is asynchronous in nature, it can arrive at any time instant. Therefore, the first "physical" sampling cell can not necessarily be the "Sampling cell 1" 502-1 from FIG. 5. FIG. 6 illustrates an example signal timing diagram of a sampling process of the sampling system 500 depicted in FIG. 5. In the example signal timing diagram illustrated in FIG. 6, fifty-three clock pulses and a trigger signal are illustrated. The asynchronous trigger signal arrives with respect to the sampling clocks. For example, first 49 bins are missed as the asynchronous trigger signal arrives near the 50 bin. Therefore, an efficient technique is required to locate the first sampling cell.

In accordance with an embodiment of the invention, a sampling system includes a sampler array that includes sampling cells, a timing controller connected to the sampler array to form a closed loop and configured to correct a timing mismatch in the sampler array, and a time to digital converter (TDC) configured to perform indexing of the sampling cells in the sampler array. In some embodiments, the TDC is further configured to locate a first sampling cell and a last sampling cell of the sampling cells in the sampler array in response to a trigger signal. In some embodiments, the TDC is further configured to locate the first sampling cell in the sampler array that corresponds to an arrival of the trigger signal. In some embodiments, the timing controller is further configured to synchronize the closed loop based on an external reference clock for sampling clock alignment. In some embodiments, the sampling system further includes an analog-to-digital converter (ADC) configured to convert an analog output of the sampler array into a digital output signal. In some embodiments, the sampling system further includes a digital signal processing (DSP) unit configured to process the digital output signal based on an input from the TDC. In some embodiments, the TDC is further configured to perform indexing of the sampling cells in the sampler array to generate a TDC code, and the DSP unit is further configured to rearrange data in the digital output signal depending on the TDC code. In some embodiments, the sampling cells are configured to capture and store analog values at discrete time intervals, and each of the sampling cells is configured to operate in one of a sampling mode and a readout mode. In some embodiments, each of the sampling cells includes a sampling switch, a capacitor, a buffer, a readout switch, and a delay cell, where the sampling switch and the capacitor are configured to capture and store analog data, and where the readout switch and the buffer are configured to read the stored analog data. In some embodiments, data that is read out from the sampler array is sequentially arranged in a digital domain.

Figure 7:
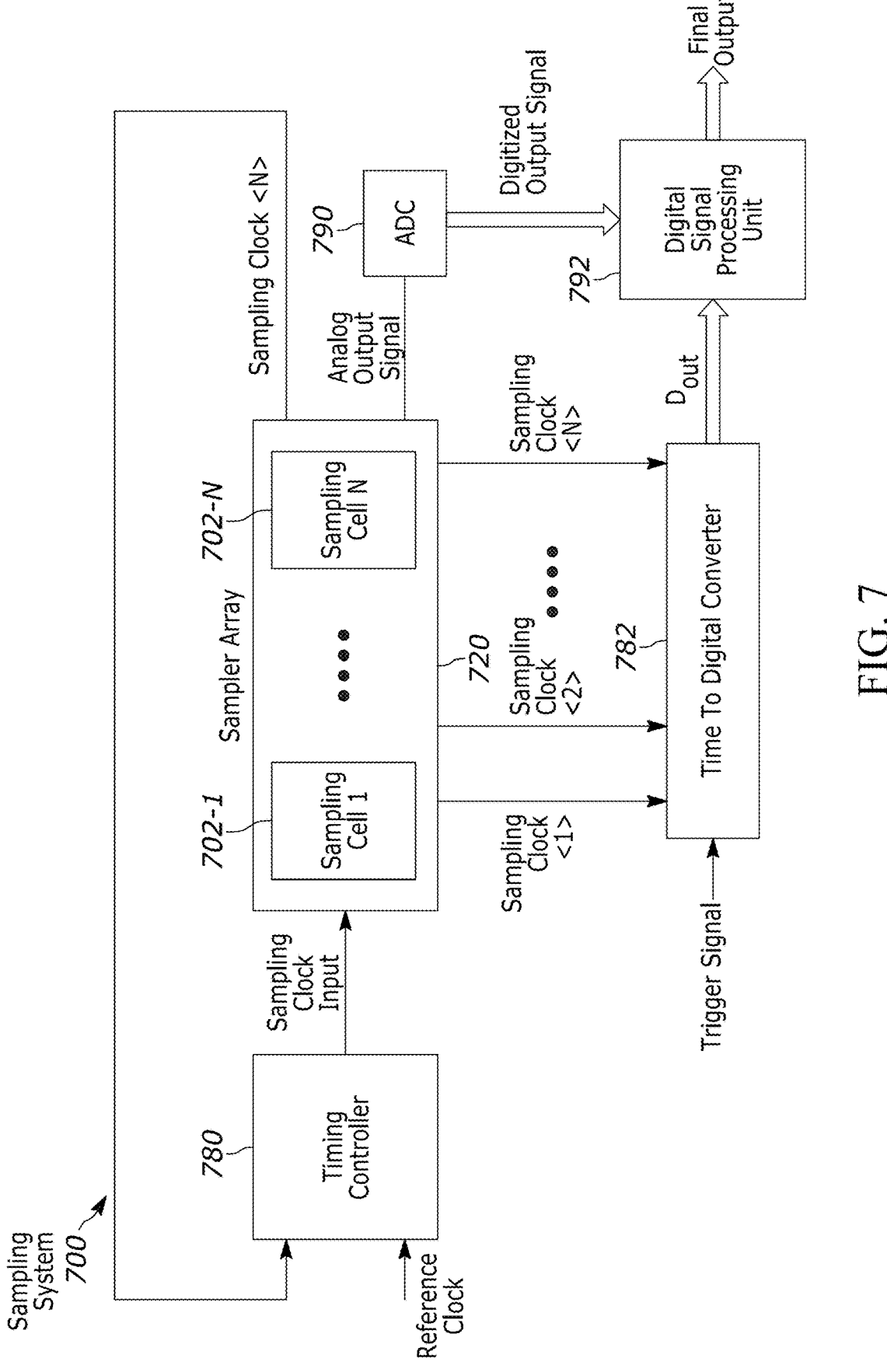
FIG. 7 depicts a sampling system with a closed-loop configuration in accordance to an embodiment of the invention.

FIG. 7 depicts a sampling system 700 with a closed-loop configuration in accordance to an embodiment of the invention. In the embodiment depicted in FIG. 7, the sampling system 700 includes a sampler array 720 with N (N being a positive integer) sampling cells 702-1, . . . , 702-N, a timing controller 780, a Time to Digital Converter (TDC) 782, an ADC 790, and a digital signal processing (DSP) unit 792. The sampling system 700 can achieve precise timing of the sampler array 720 and thus help in uniformly capturing the signals and use an indexing scheme to locating the first sampling cell and the last sampling cell of the sampler array 720. The sampling cells 702-1, . . . , 702-N depicted in FIG. 7 may be the same as or similar to the sampling cells 102-1, . . . , 102-N depicted in FIG. 1 and/or the sampling cells 502-1, . . . , 502-N depicted in FIG. 5. In some embodiments, the sampling cells 702-1, . . . , 702-N are configured to capture and store analog values at discrete time intervals, and each of the sampling cells is configured to operate in one of a sampling mode and a readout mode. In some embodiments, each of the sampling cells includes a sampling switch, a capacitor, a buffer, a readout switch, and a delay cell, the sampling switch and the capacitor are configured to capture and store analog data, and the readout switch and the buffer are configured to read the stored analog data. In some embodiments, data that is read out from the sampler array is sequentially arranged in a digital domain. The sampling system 700 can be used in various applications, such as industrial applications, medical applications, computer applications, and/or consumer or enterprise applications. Although the illustrated sampling system 700 is shown with certain components and described with certain functionality herein, other embodiments of the sampling system 700 may include fewer or more components to implement the same, less, or more functionality.

In the embodiment depicted in FIG. 7, an asynchronous, index-based scheme is introduced to dynamically assign the first sampling cell and the last sampling cell during the sampling process, which is mainly achieved by incorporating the TDC 782 with the sampler array 720. Specifically, the sampling clock signals from all of the sampling cells 702-1, . . . , 702-N in the sampler array 720 are connected to the TDC 782. In the embodiment depicted in FIG. 7, the timing controller 780 is connected to the sampler array 720 to form a closed loop and configured to synchronize the closed loop based on an external reference clock for sampling clock alignment and the TDC 782 is configured to perform indexing of the sampling cells in the sampler array to generate a TDC code. In some embodiments, the timing controller 780 includes a phase detector (e.g., the phase detector 530 depicted in FIG. 5) and a charge pump (e.g., the charge pump 532 depicted in FIG. 5). The output of the TDC, an N-bit code $D_{out}$, provides the location of the sampling cell where the trigger signal arrived, which can be indexed as the first cell. Because the sampling system 700 operates in a closed loop, the $N^{th}$ sampling cell is linked back to the first cell. Consequently, $D_{out}-1$ can be indexed as the last sampling cell. In some embodiments, once the sampling process is completed, the captured signal is read out and digitized using a low-speed ADC (e.g., the ADC 790) configured to convert an analog output of the sampler array 720 into a digital output signal. In some embodiments, the DSP unit 792 processes the digitized output from the ADC 790 and rearranges the data depending on the TDC code, $D_{out}$. The DSP unit 792 can be realized in hardware (e.g., circuits), software, firmware, or a combination thereof. The ADC output and the TDC code can be fed to a computer and the sample rearrangement and postprocessing can be achieved through MATLAB or other signal processing tools. In another implementation, the DSP unit 792 is implemented in Field Programmable Gate Array (FPGA) using efficient Register-Transfer Level (RTL) coding.

In some embodiments, the sampling system 700 has clock freezing capability to enable the readout of the sampling cells 702-1, . . . , 702-N. In some embodiments, a current-starved inverter chain in the sampling cells 702-1, . . . , 702-N functions as the delay line for phase alignment.

Figure 8:
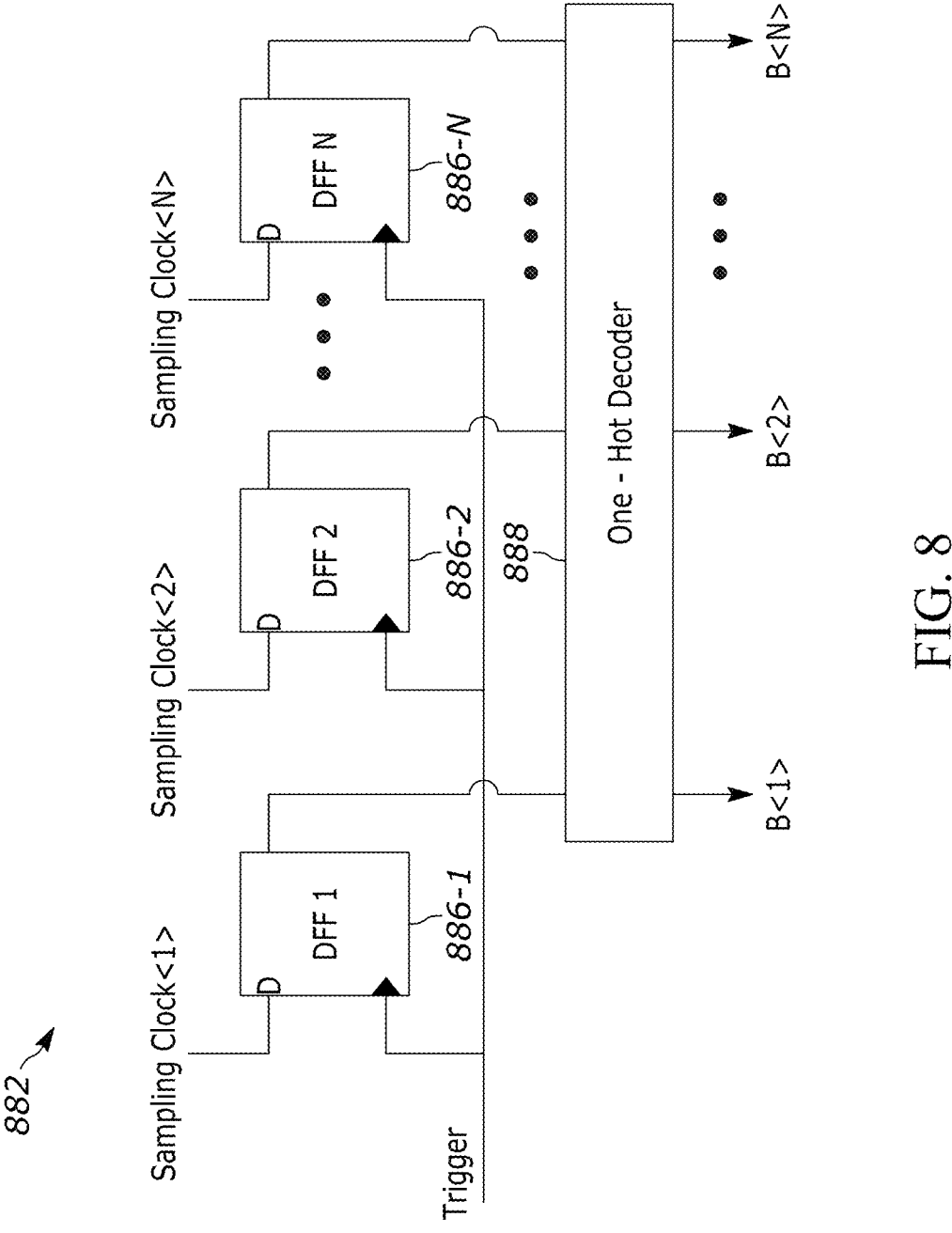
FIG. 8 depicts a delay line based TDC in accordance to an embodiment of the invention.

A delay line based TDC can be used to achieve indexing capability. FIG. 8 depicts a delay line based TDC 882 in accordance to an embodiment of the invention. In the embodiment depicted in FIG. 8, the delay line based TDC 882 includes an array of D-flipflops 886-1, . . . , 886-N (N being a positive integer) and a one-hot decoder 888. In the embodiment depicted in FIG. 8, the sampling clock from each of the sampling cells 702-1, . . . , 702-N in the sampler array 720 is connected to the input of a respective flip flop. All flip flops are clocked using an asynchronous trigger signal. In the embodiment depicted in FIG. 8, the output of flipflops provides an N bit thermometer-based code that represents the location of first sampling cells, which is converted to an active low one hot code using the one-hot decoder 888, which can be implemented in digital logic(s).

Once the first sampling cell and the last sampling cell are identified, the propagation of the sampling clock must also be controlled appropriately. For instance, if $k^{th}$ cell is identified as the first sampling cell, the sampling clock will loop back through the feedback and must stop propagating at $k-1^{th}$ cell, which ensures that all N sampling cells are utilized and the sampling clock is paused such that the captured samples are not overwritten until the completion of read out process. This can be achieved by placing a switch in the delay cells.

Figure 9:
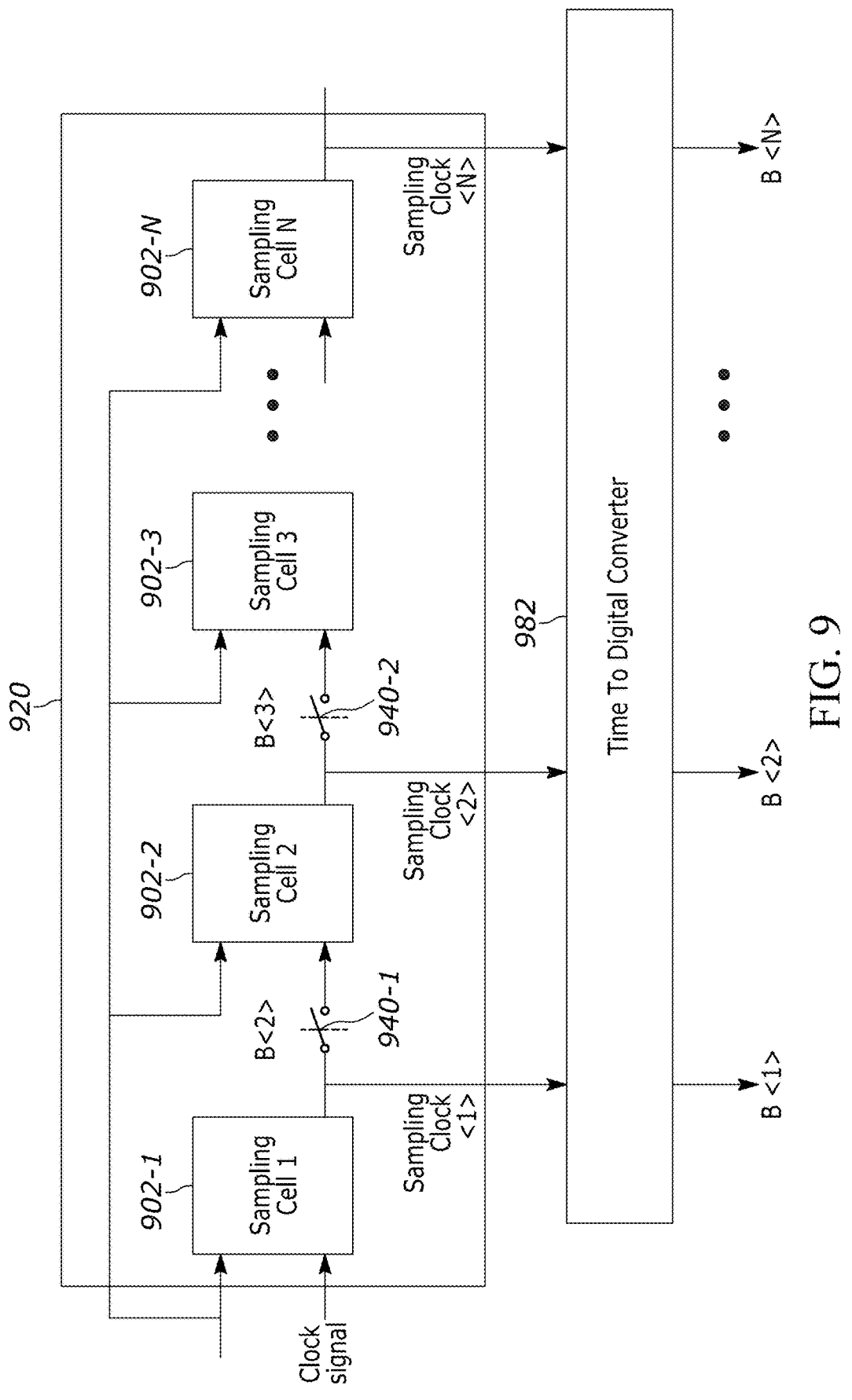
FIG. 9 depicts a sampler and TDC arrangement in accordance to an embodiment of the invention.
Figure 10:
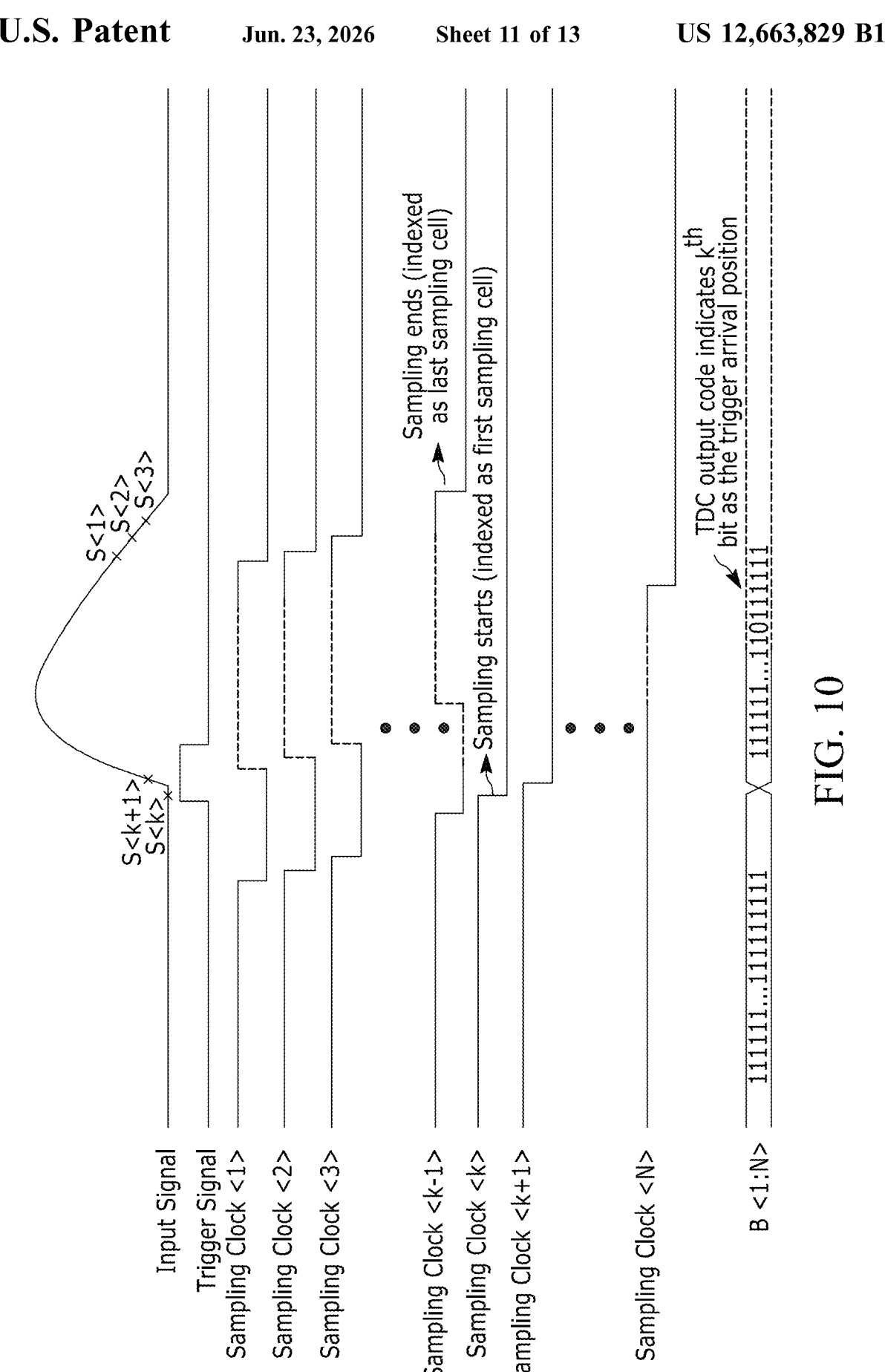
FIG. 10 illustrates an example signal timing diagram of the sampler and TDC arrangement depicted in FIG. 9.

FIG. 9 depicts a sampler and TDC arrangement in accordance to an embodiment of the invention. In the embodiment depicted in FIG. 9, a switch 940-1, . . . , or 940-N-1 (N being a positive integer) is placed between in two of the respective sampling cells 902-1, . . . , 902-N in a sampler array 920. The sampling cells 902-1, . . . , 902-N depicted in FIG. 9 may be the same as or similar to the sampling cells 102-1, . . . , 102-N depicted in FIG. 1, the sampling cells 502-1, . . . , 502-N depicted in FIG. 5, and/or the sampling cells 702-1, . . . , 702-N depicted in FIG. 7. The one hot output (e.g., from the one-hot decoder 888 depicted in FIG. 8) turns off the switch at the $k-1^{th}$ cell and thus the propagation of sampling clock can be paused after the completion of N sampling cells. FIG. 10 illustrates an example signal timing diagram of the sampler and TDC arrangement depicted in FIG. 9. In the timing diagram illustrated in FIG. 10, the first sample of the input signal is stored at S<k> as k$^{th}$ cell is indexed as the first.

Figure 11:
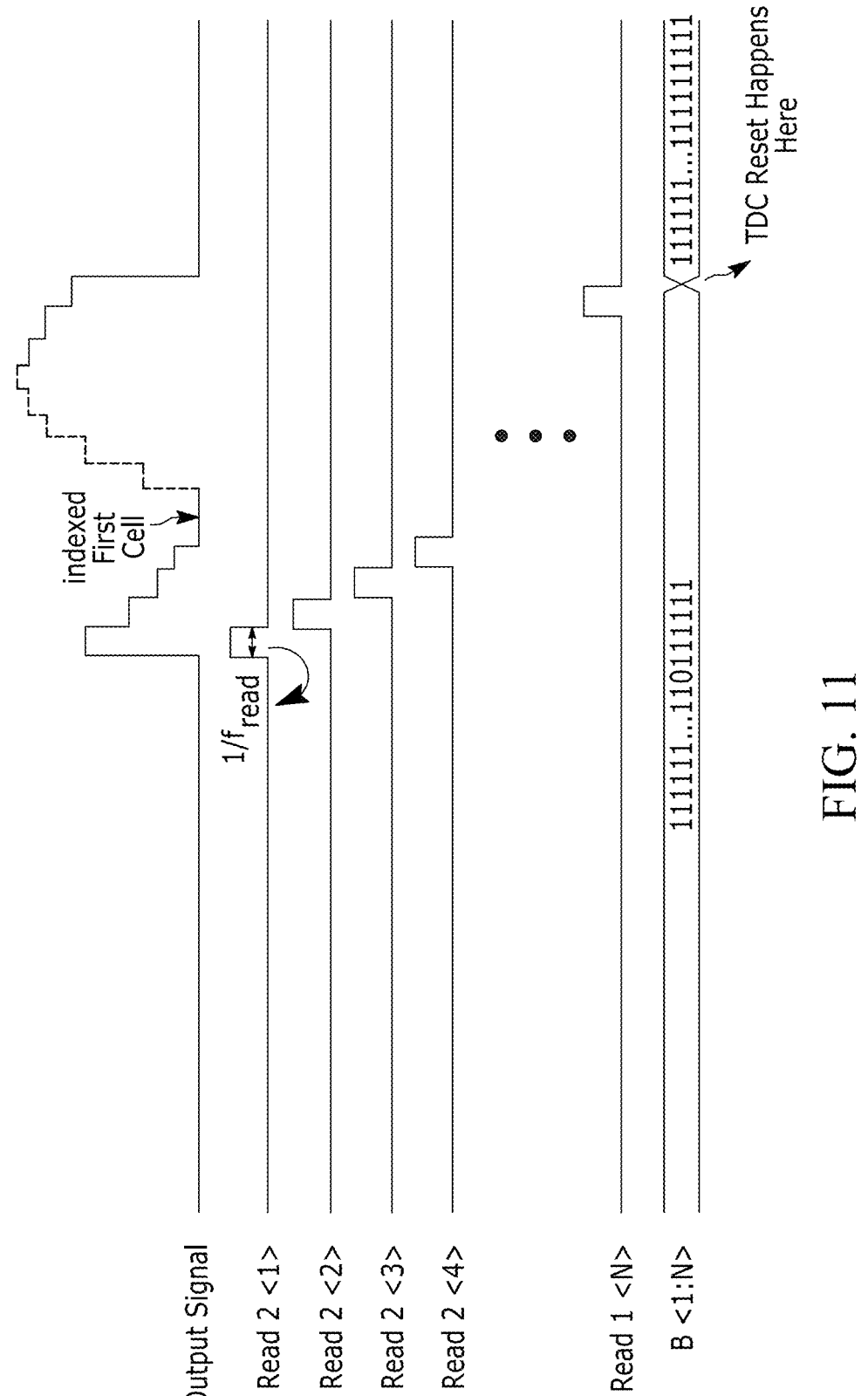
FIG. 11 illustrates an example signal timing diagram of a read out process.

The sampled signals can be readout from each sampling cell using a one hot decoder scheme as explained for a conventional sampler array. However, the readout process occurs in a sequential manner. Consequently, the signal that is read out from the "physical" sampling cell 1 will not necessarily be the indexed first sampling cell, which will result in discontinuity in the output signal as illustrated in FIG. 11 (FIG. 11 illustrates an example signal timing diagram of a read out process). This can be efficiently rearranged in a DSP block (e.g., the DSP unit 792 depicted in FIG. 7). Once the readout process is completed, the TDC code must be set to all "Highs", which will restart the seamless propagation of sampling clock across the loop and thereby waiting for the next trigger signal.

Figure 12:
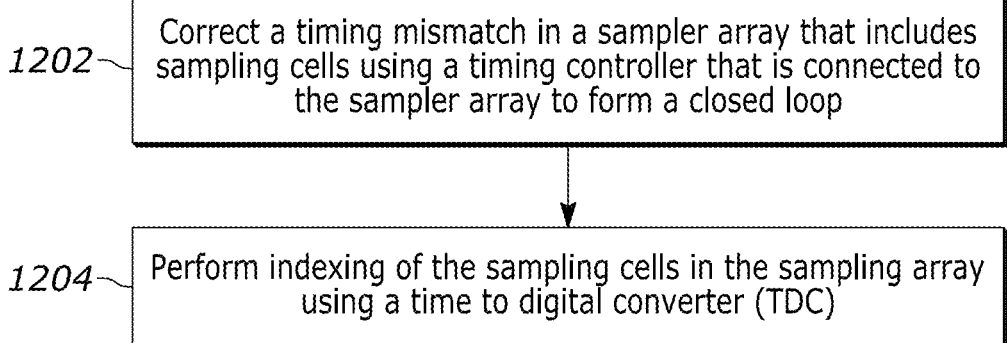
FIG. 12 is a process flow diagram of a method for sampling in accordance to an embodiment of the invention.

FIG. 12 is a process flow diagram of a method for sampling in accordance to an embodiment of the invention. According to the method, at block 1202, a timing mismatch in a sampler array that includes sampling cells is corrected using a timing controller that is connected to the sampler array to form a closed loop. At block 1204, indexing of the sampling cells in the sampler array is performed using a time to digital converter (TDC). In some embodiments, an analog output of the sampler array is converted into a digital output signal using an analog-to-digital converter (ADC). In some embodiments, data in the digital output signal is rearranged based on an input from the TDC using a digital signal processing (DSP) unit. The sampling cells may be similar to, the same as, or a component of the sampling cells 102-1, . . . , 102-N depicted in FIG. 1, the sampling cells 502-1, . . . , 502-N depicted in FIG. 5, the sampling cells 702-1, . . . , 702-N depicted in FIG. 7, and/or the sampling cells 902-1, . . . , 902-N depicted in FIG. 9. The sampler array may be similar to, the same as, or a component of the sampler array 520 depicted in FIG. 5, the sampler array 720 depicted in FIG. 7, and/or the sampler array 920 depicted in FIG. 9.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A sampling system, the sampling system comprising:
a sampler array that comprises a plurality of sampling cells;
a timing controller connected to the sampler array to form a closed loop and configured to correct a timing mismatch in the sampler array; and
a time to digital converter (TDC) configured to perform indexing of the sampling cells in the sampler array;
wherein the sampling cells are configured to capture and store a plurality of analog values at a plurality of discrete time intervals, and wherein each of the sampling cells is configured to operate in one of a sampling mode and a readout mode.

2. The sampling system of claim 1, wherein the TDC is further configured to locate a first sampling cell and a last sampling cell of the sampling cells in the sampler array in response to a trigger signal.

3. The sampling system of claim 2, wherein the TDC is further configured to locate the first sampling cell in the sampler array that corresponds to an arrival of the trigger signal.

4. The sampling system of claim 1, wherein the timing controller is further configured to synchronize the closed loop based on an external reference clock for sampling clock alignment.

5. The sampling system of claim 1, further comprising an analog-to-digital converter (ADC) configured to convert an analog output of the sampler array into a digital output signal.

6. The sampling system of claim 5, further comprising a digital signal processing (DSP) unit configured to process the digital output signal based on an input from the TDC.

7. The sampling system of claim 6, wherein the TDC is further configured to perform indexing of the sampling cells in the sampler array to generate a TDC code, and wherein the DSP unit is further configured to rearrange data in the digital output signal depending on the TDC code.

8. The sampling system of claim 1, wherein each of the sampling cells comprises a sampling switch, a capacitor, a buffer, a readout switch, and a delay cell, wherein the sampling switch and the capacitor are configured to capture and store analog data, and wherein the readout switch and the buffer are configured to read the stored analog data.

9. The sampling system of claim 1, wherein data that is read out from the sampler array is sequentially arranged in a digital domain.

10. A sampling system, the sampling system comprising:
a sampler array that comprises a plurality of sampling cells;
a timing controller connected to the sampler array to form a closed loop and configured to synchronize the closed loop based on an external reference clock for sampling clock alignment; and
a time to digital converter (TDC) configured to perform indexing of the sampling cells in the sampler array to generate a TDC code;

wherein the sampling cells are configured to capture and store a plurality of analog values at a plurality of discrete time intervals, and wherein each of the sampling cells is configured to operate in one of a sampling mode and a readout mode.

11. The sampling system of claim 10, wherein the TDC is further configured to locate a first sampling cell and a last sampling cell of the sampling cells in the sampler array in response to a trigger signal, and wherein the TDC is further configured to locate the first sampling cell in the sampler array that corresponds to an arrival of the trigger signal.

12. The sampling system of claim 10, further comprising an analog-to-digital converter (ADC) configured to convert an analog output of the sampler array into a digital output signal.

13. The sampling system of claim 12, further comprising a digital signal processing (DSP) unit configured to process the digital output signal based on the TDC code.

14. The sampling system of claim 10, wherein each of the sampling cells comprises a sampling switch, a capacitor, a buffer, a readout switch, and a delay cell, wherein the sampling switch and the capacitor are configured to capture and store analog data, and wherein the readout switch and the buffer are configured to read the stored analog data.

15. The sampling system of claim 10, wherein data that is read out from the sampler array is sequentially arranged in a digital domain.

16. A sampling system, the sampling system comprising:
a sampler array that comprises a plurality of sampling cells;
a timing controller connected to the sampler array to form a closed loop and configured to correct a timing mismatch in the sampler array; and
a time to digital converter (TDC) configured to perform indexing of the sampling cells in the sampler array;
further comprising;
an analog-to-digital converter (ADC) configured to convert an analog output of the sampler array into a digital output signal; and

a digital signal processing (DSP) unit configured to process the digital output signal based on an input from the TDC;
wherein the TDC is further configured to perform indexing of the sampling cells in the sampler array to generate a TDC code, and wherein the DSP unit is further configured to rearrange data in the digital output signal depending on the TDC code.

17. A sampling system, the sampling system comprising:
a sampler array that comprises a plurality of sampling cells;
a timing controller connected to the sampler array to form a closed loop and configured to correct a timing mismatch in the sampler array; and
a time to digital converter (TDC) configured to perform indexing of the sampling cells in the sampler array;
wherein each of the sampling cells comprises a sampling switch, a capacitor, a buffer, a readout switch, and a delay cell, wherein the sampling switch and the capacitor are configured to capture and store analog data, and wherein the readout switch and the buffer are configured to read the stored analog data.

18. A sampling system, the sampling system comprising:
a sampler array that comprises a plurality of sampling cells;
a timing controller connected to the sampler array to form a closed loop and configured to synchronize the closed loop based on an external reference clock for sampling clock alignment; and
a time to digital converter (TDC) configured to perform indexing of the sampling cells in the sampler array to generate a TDC code;
wherein each of the sampling cells comprises a sampling switch, a capacitor, a buffer, a readout switch, and a delay cell, wherein the sampling switch and the capacitor are configured to capture and store analog data, and wherein the readout switch and the buffer are configured to read the stored analog data.

* * * * *